TRIPLE STAGE UPRIGHT FOR LIFT TRUCK

Original Filed May 18, 1964 5 Sheets-Sheet 1

INVENTOR
RICHARD F. McINTOSH
BY R. C. Wiesle
ATTORNEY

TRIPLE STAGE UPRIGHT FOR LIFT TRUCK

Original Filed May 18, 1964 5 Sheets-Sheet 5

INVENTOR
RICHARD F. McINTOSH
BY R. C. Wiesle
ATTORNEY

TRIPLE STAGE UPRIGHT FOR LIFT TRUCK

Original Filed May 18, 1964 5 Sheets-Sheet 3

INVENTOR
RICHARD F. McINTOSH
BY J. P. Wiessler
ATTORNEY

TRIPLE STAGE UPRIGHT FOR LIFT TRUCK

Original Filed May 18, 1964 5 Sheets-Sheet 4

INVENTOR
RICHARD F. McINTOSH
BY R. P. Wiesler
ATTORNEY

TRIPLE STAGE UPRIGHT FOR LIFT TRUCK

Original Filed May 18, 1964 5 Sheets-Sheet 5

INVENTOR
RICHARD F. McINTOSH
BY J. C. Wiessler
ATTORNEY

United States Patent Office

Re. 27,731
Reissued Aug. 14, 1973

27,731

TRIPLE STAGE UPRIGHT FOR LIFT TRUCK

Richard F. McIntosh, Battle Creek, Mich., assignor to Clark Equipment Company

Original No. 3,298,463, dated Jan. 17, 1967, Ser. No. 368,064, May 18, 1964. Application for reissue Feb. 16, 1971, Ser. No. 115,895
Int. Cl. B66b *9/20*
U.S. Cl. 187—9 6 Claims

Matter enclosed in heavy brackets [ ] appears in the original patent but forms no part of this reissue specification; matter printed in italics indicates the additions made by reissue.

ABSTRACT OF THE DISCLOSURE

This invention relates generally to a triple-stage telescopic extensible upright or mast assembly supported from the truck and supporting a lift fork or other load engaging means employed with such trucks. More specifically, the invention comprises an improvement in triple-stage upright constructions of the type disclosed in Patent No. 3,213,967.

In lift truck uprights of the type contemplated it has long been a problem to provide a construction which affords the operator of the truck good visibility through the upright when the load engaging means is at or near floor level. My invention provides a novel combination of telescopic upright structure, telescopic hydraulic lifting ram or cylinder structure, and dual lifting chain structure on each side of the upright which together provide a compact structure hvaing a relatively low collapsed height, high maximum elevation, and affords substantially improved operator visibility. It is therefore a principal object of the present invention to provide an improved triple-stage telescopic upright structure which affords excellent operator visibility through the structure.

It is another object of the invention to provide in lift truck uprights an improved combination of lifting elements, such as chains, combined in the upright and reeved in such a manner that maximum utility of the upright is effected.

Another object of the present invention is to provide in triple-stage uprights for lift trucks lifting elements, such as chains, wherein a pair thereof are disposed on each side of a lift cylinder, one of each pair of lifting elements being reeved on sprocket or wheel means having an axis transverse of the truck and the other of each of said pairs of lifting elements being reeved on sprocket or wheel means having an axis longitudinal of the truck, whereby to provide a combination of lifting elements which minimizes interference with operator visibility through the upright.

Other objects, features and advantages of the invention will readily appear to persons skilled in the art from the detailed description of the invention which follows.

Specifically, in carrying out the invention, there is provided a mast structure comprising laterally spaced-apart stationary uprights secured to the lift truck. Such uprights receive in forwardly offset nested relation a laterally spaced-apart pair of extensible uprights each of which is preferably I-shaped in cross-section, and which latter extensible uprights receive also in forwardly offset nested relation a second laterally spaced-apart pair of extensible uprights each of which is also preferably I-shaped in cross-section. The load carriage is arranged to move up and down in the inner extensible uprights, and sets of rollers are provided between each pair of uprights and between the inner pair of uprights and the load carriage in order to provide full structural support both longitudinally and laterally of the truck during the raising and lowering of the load carriage and the extensible uprights. A preferred construction of rollers, as aforesaid, is disclosed in detail in said aforementioned co-pending application of Hastings and Backofen. A vertically extending telescopic hydraulic ram structure is mounted centrally of the upright from the lower end of the first extensible upright. An intermediate cylinder of the telescopic ram assembly carries a pair of transversely spaced sprocket members, over which are reeved a pair of transversely spaced chains anchored at their one ends to the outer cylinder member of the ram structure and at the opposite ends to the load carriage. The first pair of sprocket means rotates on an axis transverse of the truck. A second pair of sprocket means are mounted in transversely spaced relation adjacent the lower end of the first extensible upright and are adapted to rotate about axes longitudinal of the truck. A second pair of lifting chains are preferably secured at their one ends to the outer cylinder of the telescopic ram and at their opposite ends adjacent the upper ends of said stationary uprights.

In the accompanying drawings, there is illustrated a preferred embodiment of the invention wherein.

Figure 1:
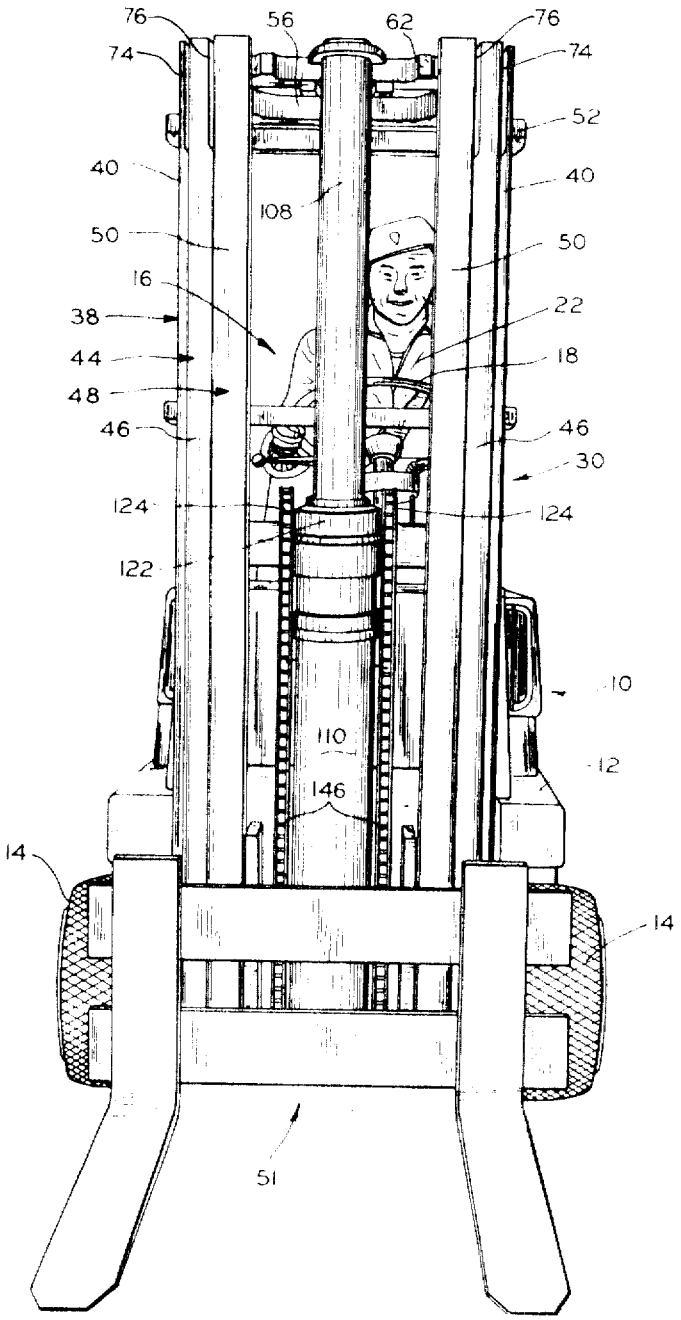
FIGURE 1 is a front view of an industrial lift truck showing the load carriage lowered to the bottom of the inner extensible upright, and exemplifying the good operator visibility which is provided through the upright construction.
Figure 2:
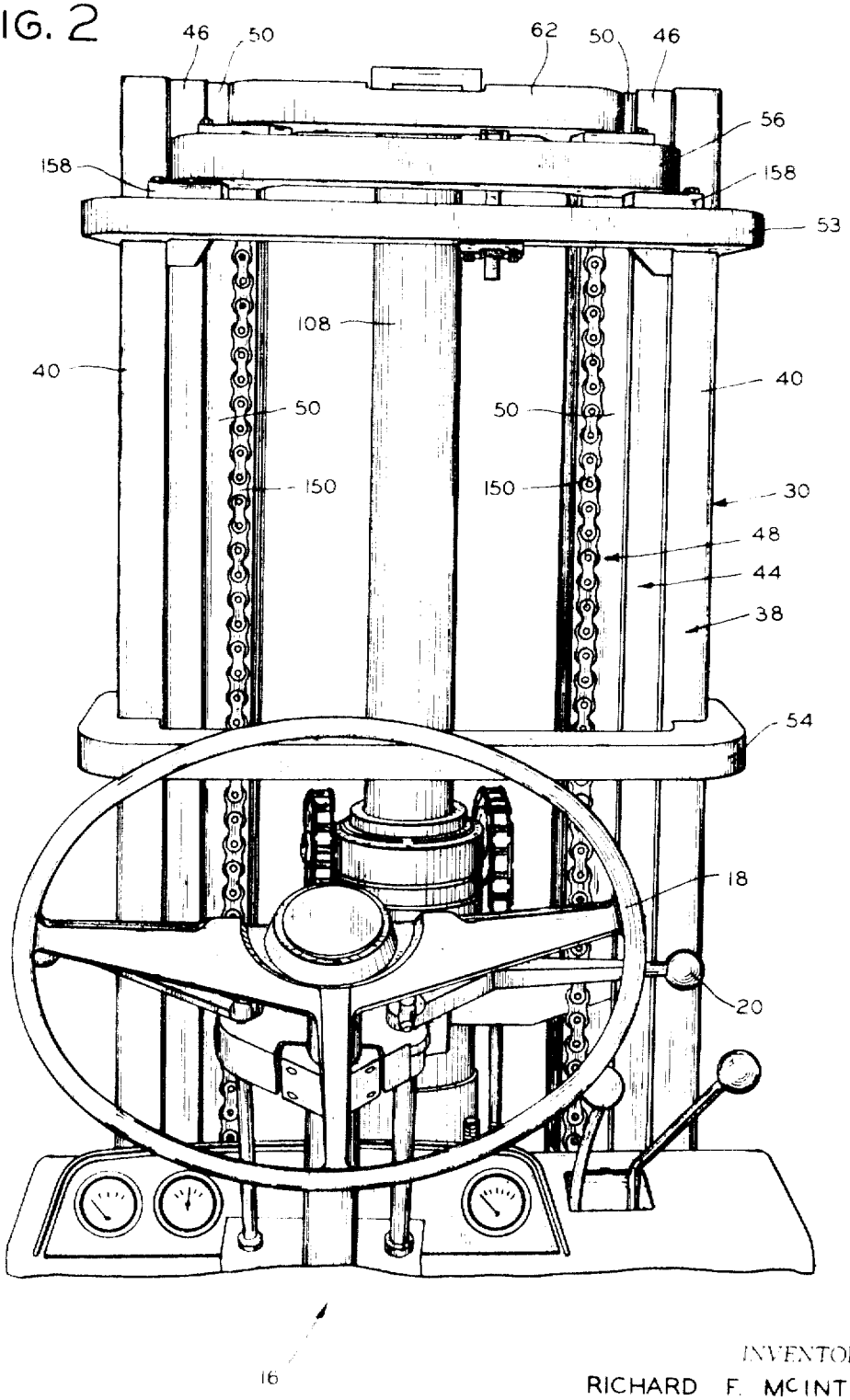
FIGURE 2 is an enlarged rear view of that portion of the upright shown in FIG. 1 which extends above the front portion of the truck, and shows a portion of the operator's compartment, all as viewed from behind the operator's seat on the truck.

Referring now in detail to the drawings, a conventional industrial lift truck is shown at numeral 10 having a frame and body construction 12 mounted on a pair of steering wheels, not shown, at the rear end thereof and a pair of traction wheels 14 forwardly thereof, and embodying suitable power components, which may be either electric or gas, for operating the truck from an operator's compartment 16, which includes an operator's seat mounted above the engine compartment, operator's foot controls, such as accelerator pedal and brake, not shown, and a plurality of hand controls and instrumentation, such as is shown in FIG. 2, including a steering wheel 18, a control lever 20 for operating the upright and a power train control lever supported from the steering post. An operator is illustrated in FIG. 1 at numeral 22 as he would appear to an observer in front of the truck when seated on the truck in a normal position for driving the truck.

The upright assembly of the present invention is illustrated generally at numeral 30, the assembly being monuted on the truck by means of a pair of rearwardly extending support plate 32 secured to a lower fixed transverse plate 34 of the upright assembly and adapted to be pivotably mounted by means of openings 36 thereof upon bearing portions of the drive axle, not shown. Brackets 42 secure the upper end of plates 32 to a lower fixed mast section 38 which includes a pair of transversely spaced opposed channel members 40 of substantially C-shaped cross-section. Channel members 40 are arranged to receive an intermediate mast section 44 formed of two laterally spaced I-beams 46, the intermediate mast section 44 being roller supported and arranged for longitudinal movement relative to the stationary mast section 38, as will be hereinafter described. In addition to the intermediate extensible section 44, an inner extensible mast section 48 is formed of two laterally spaced I-beams 50 which are telescopically arranged inwardly of I-beams 46 for longitudinal movement relative to the stationary mast section 38 and to the intermediate mast section 44, the inner mast 48 being roller supported and arranged for longitudinal movement relative to the intermediate section 44. A load or fork carriage 51 is roller mounted for elevation in a well-known manner in inner mast section 48. A bracket 52 extends rearwardly of each channel member 40 and is adapted to be connected to hydraulic upright tilt cylinder means, not shown, carried by the truck for tilting the upright longitudinally of the truck.

Mast section 38 is cross-braced for rigidity by means of transverse brace members 35 and 54 (which are in addition to lower brace member 34), intermediate mast section 44 is cross-braced by means of upper, central and lower transverse braces 56, 58 and 60, respectively, and inner mast section 48 is cross-braced by upper, central and lower brace members 62, 64 and 66, respectively. The upper cross-braces of the respective mast sections are arranged in vertically spaced relation to each other so that there is no interference therebetween, as shown in the figures, and the braces 64 and 66 of the inner mast and 58 and 60 of the intermediate mast are arranged so that they can pass inside of the various other cross-braces during extension and reaction of the upright, as shown in the figures.

Figure 7:
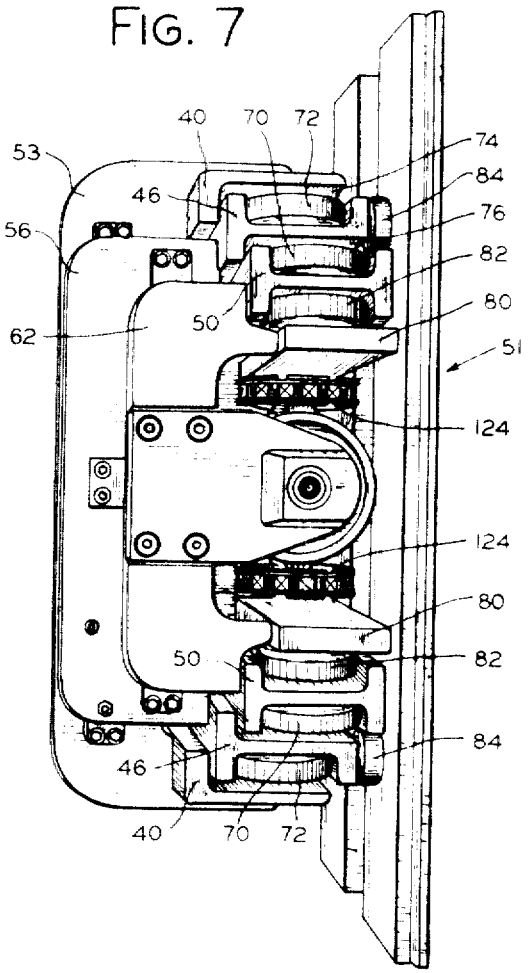
FIGURE 7 is a view of the upright taken from above with the load carriage in the position shown in FIG. 4.

The inner I-beam mast section 48 is nested within intermediate mast section 44 in such a manner that the forward flange of I-beams 50 are disposed outside of the forward flange of I-beams 46, and the rearward flanges of I-beam 50 are disposed within the adjacent channel portion and forwardly of the rearward flanges of I-beams 46, sets of rollers being suitably mounted between said adjacent pairs of nested I-beams 46 and 50 for supporting each of the I-beams 50 longitudinally and laterally for extensible movement relative to the adjacent I-beam 46. The upper rollers of each said set are illustrated at 70 in FIG. 7. Similarly, I-beams 46 of the first extensible mast section 44 are nested in forwardly offset overlapping relation in respect of the flange portions of outer fixed channel members 40 of mast section 38, and are also mounted for telescopic movement outwardly of channel members 40 upon sets of rollers which support I-beams 46 longitudinally and laterally relative to channel beams 40. The upper rollers of said latter roller sets are illustrated at numerals 72. Cutouts 74 are provided at the upper ends of channel beams, and cutouts 76 are provided at the upper ends of I-beams 46 (FIG. 1) so that the rollers may be mounted within the respective mast sections prior to assembly thereof, the cutouts in the upper ends of the flanges providing for by-passing of the rollers during assembly of the upright sections, and making available the use of relatively large diameter rollers 72 and 70 which extend through the respective cutout flange portions, said rollers being mounted upon the rear ends of upright beams 40 and 46 respectively.

The load carriage 51 is mounted in a well-known manner forwardly of the upright assembly, having a pair of transversely spaced fork bar members 80 (FIG. 7) secured to the load carriage and having mounted thereon upper and lower pairs of rollers, the upper rollers being shown at numeral 82, which supports the load carriage for extensible movement within the inner channel portions of I-beams 50. A pair of side thrust rollers 84 are connected to the load carriage and are adapted to roll along the outer offset edge portion of each inner I-beam member 50, said pair of side thrust rollers 84 cooperating with the inner carriage support rollers 82 for preventing a tendency of the upright to spread apart or wedge when the load carriage is eccentrically loaded, and for resisting side thrust forces imposed upon the load carriage. The particularities of the nested offset I-beam upright structure, the mounting of the load carriage thereon and the manner of providing roller sets as aforesaid is explained in detail in the above-mentioned co-pending application, and need not be detailed further in this application. The importance of the forwardly offset nested upright structure in the present application is that such upright structure combines with my novel chain reeving structure to provide an improved upright, as will become apparent as the description proceeds.

Figure 8:
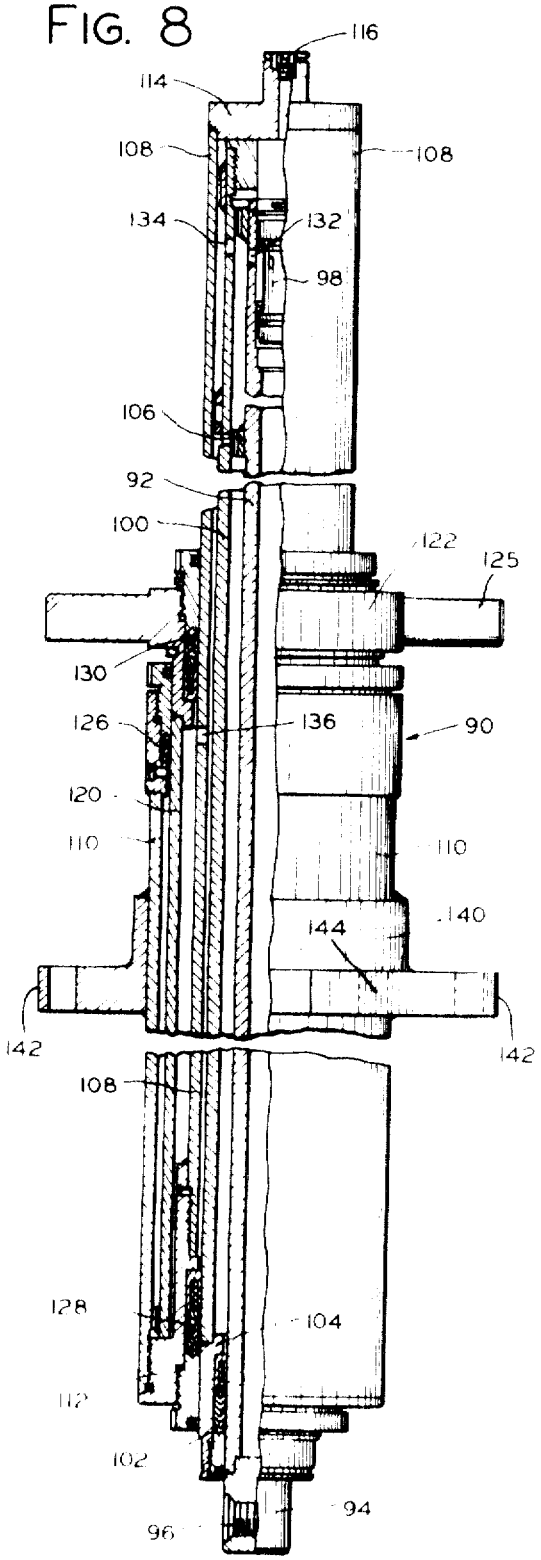
FIGURE 8 is a broken-away partial longitudinal sectional view of the telescopic ram structure which is utilized in the upright.

A multiple cylinder telescopic hydraulic ram assembly is shown generally at numeral 90 (FIG. 8). It comprises essentially five hollow tubular members in concentric sliding relation wherein the inner tubular member 92 is secured at its base end 94 to fixed brace 34 at the bottom of fixed upright 38 and is adapted to be connected to fluid pressure pump means by a flexible conduit, not shown, at 96, thereby serving as a rigid upright conduit for communicating pressure fluid to and from the hydraulic ram assembly 90 through a controlled valve means 98 at the upper end of the inner tube 92, the tube 92 being of somewhat less length than outer upright section 38. An inner structural tubular member 100 is fixedly mounted at the lower end thereof to transverse brace member 60 at the lower end thereof intermediate beams 46, being open at both the top and bottom, having sealing means 102 slidable on the wall of inner tubular conduit 92, and a stop member 104 which is adapted to abut a stop 106 on conduit 92 when the tube 100 is fully extended, as in FIG. 6. An integral inner-outer tubular ram construction 108, 110 is threadedly secured at 112 to function as a single telescopic ram unit, and encompasses tube 100, inner tube 108 thereof being slightly less in length than the height of outer mast section 40 and having a closed head end 114 which is suitably connected at 116 to the upper transverse brace 62 of inner mast section 48. Nested within the longitudinal annular space provided between tubular members 108 and 110 is an intermediate hydraulic tubular ram 120 which is approximately one-half the length of outer upright section 38 and upon the upper end of which is mounted a cross head 122 to which is connected in transversely spaced relation a pair of sprocket members 124 which are mounted for rotation on outwardly extending stub shaft members 125 about an axis transverse of the upright. Suitable annular packing seals are provided at 126 at the upper end of outer tube 110, at 128 at the lower end of inner elevatable tube 100, and at 130 at the upper cross head end of intermediate telescopic tube 120. Pairs of stop means are suitably located at the upper and lower ends of adjacent telescopic tube members for limiting the extension of one relative to the other. A plurality of circumferential openings are provided at 132 in tubular conduit 92, at 134 in the inner tube 100, and at 136 in inner telescopic tube 108 for communicating the various longitudinal annular spaces between the respective adjacent pairs of tubular members one with another.

Figure 3:
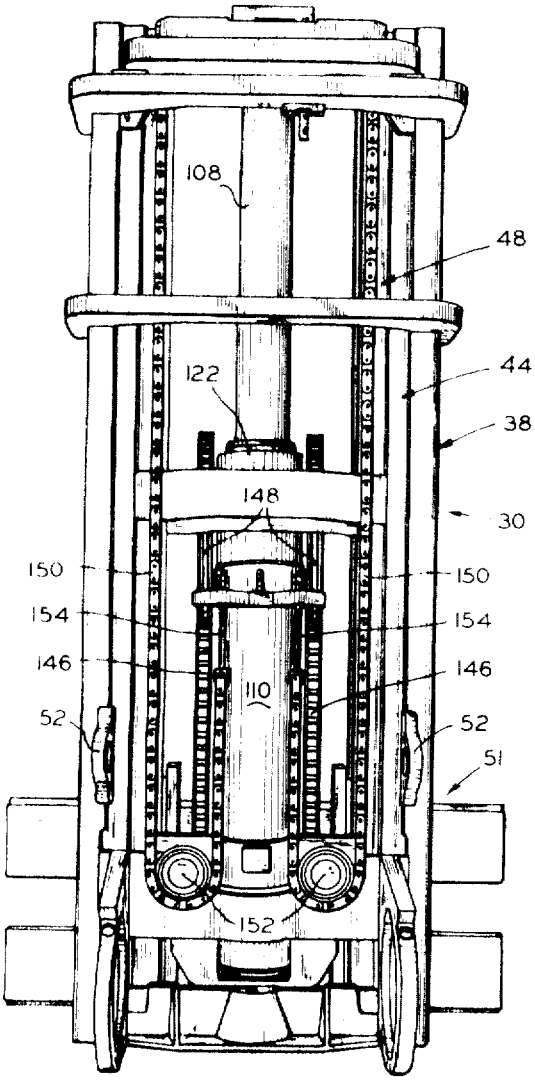
FIGURE 3 is a full rear view of the upright shown in FIG. 1 with the entire upright assembly dismounted from the truck and the load carriage at floor level.
Figure 4:
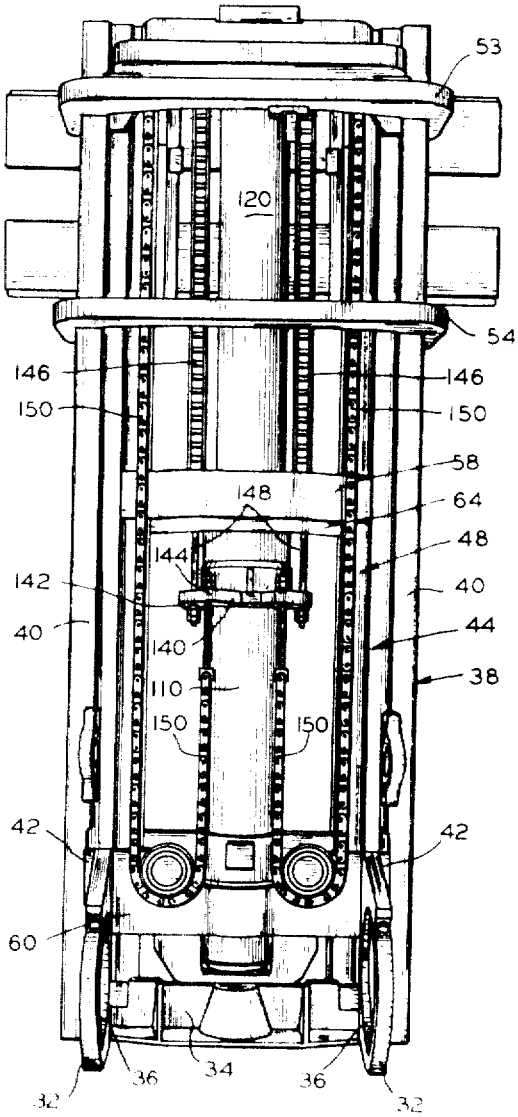
FIGURE 4 is a view of the upright as shown in FIG. 3 with the load carriage elevated to a position adjacent the upper end of the retracted upright assembly.

An anchor plate 140 is secured, as by welding, to the outer tube 110. Plate 140 includes a pair of transversely extending ear portions 142 which extend from opposite sides of plate 140 and a pair of rearwardly projecting ear portions 144. A first pair of transversely spaced chain members 146 are reeved over sprockets 124 on cross head 122 and securely anchored at their one ends to load carriage 51. Chains 146 are anchored at their opposite ends to ears 142 of anchor plate 140 by means of a pair of long bolts 148 which extend through openings in the ear members and are secured thereto by nuts threaded on the ends of the bolts. Thus, the pair of chains 146 are adapted, in the first stage of elevation of the upright upon communication of pressure fluid to the telescopic ram assembly 90, to elevate load carriage 51 from the ground level position shown in FIG. 3 to a full "free-lift" position, as shown in FIG. 4, as intermediate cylinder ram 120 is initially actuated upwardly along inner extensible tube 108, thereby actuating cross head 122 and sprockets 124 to elevate the load carriage at a 2:1 ratio of movement to cylinder 120 to effect such full free-lift movement of the load carriage while telescopic mast sections 44 and 48 remain fully collapsed within outer mast section 38. With the load carriage in a full free-lift position cylinder 120 is fully extended relative to cylinder 108 and stop members at the lower end of cylinder 120 contact stop members at the upper end of outer cylinder 110. Pressure fluid acts on an area at the bottom of inner-outer cylinder assembly 108, 110 to hold said assembly down during extension of cylinder 120, and anchor plate 140 thus remains in a fixed down position, as shown in FIGS. 3 and 4.

A second pair of transversely spaced chains 150 are located at right angles to chain 146 and generally rearwardly thereof, being located in substantially co-planar relation in a plane which extends transversely of the truck and reeved on a pair of transversely spaced sprockets 152 which are mounted on stub shafts for rotation at the lower end of intermediate mast section 44 on brace 60 and which are adapted for rotation about axes which extend longitudinally of the truck. The one ends of chains 150 are anchored by long bolts 154 to rearwardly extending ears 144 of anchor plate 140. The opposite ends of chains 150 are fixed secured to upper transverse brace 53 adjacent the upper end of outer fixed mast section 38 by a pair of transversely spaced brackets 158 (FIG. 2) which are nested behind the rear flanges of the I-beams 46 of intermediate mast 44 and which extend inwardly and forwardly of brace member 53 so as to provide said substantially co-planar relation of chains 150 and a nesting of the upwardly extending lengths of the pair of chains, as shown in FIGS. 2–5, behind the flanges of the inner I-beams 50. The forwardly offset nested relation of the telescopic mast sections 44 and 48 relative to each other and to outer mast section 38 provide space as required to compactly and efficiently nest the pair of chains 150 behind the upright and the ram cylinder construction so that said pair of chains 150 does not interfere to any substantial design with operator visibility through the upright when the load carriage is in any position from ground level to maximum elevation thereof.

Figure 5:
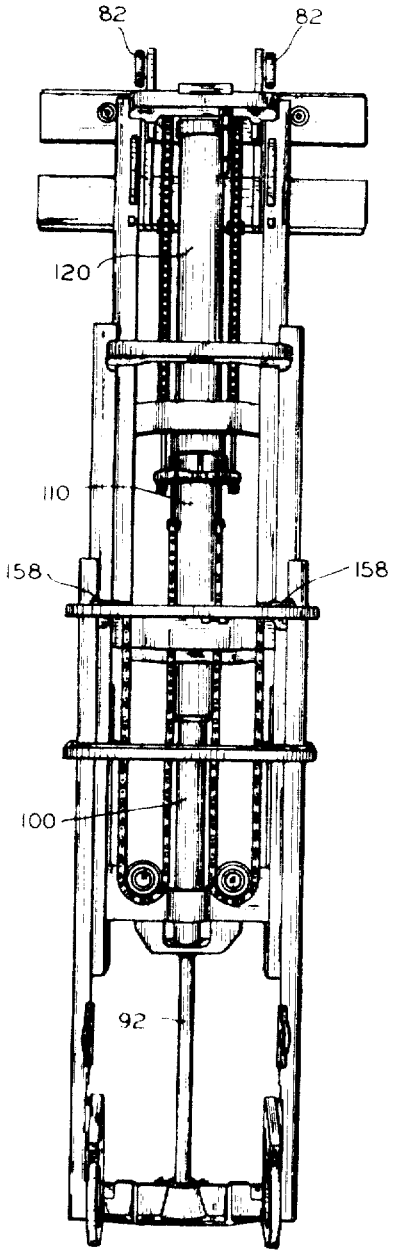
FIGURE 5 is a rear view of the upright assembly shown in the preceding figures, on a somewhat smaller scale, showing the entire assembly in a position of intermediate elevation with both pairs of extensible uprights in partially elevated position.
Figure 6:
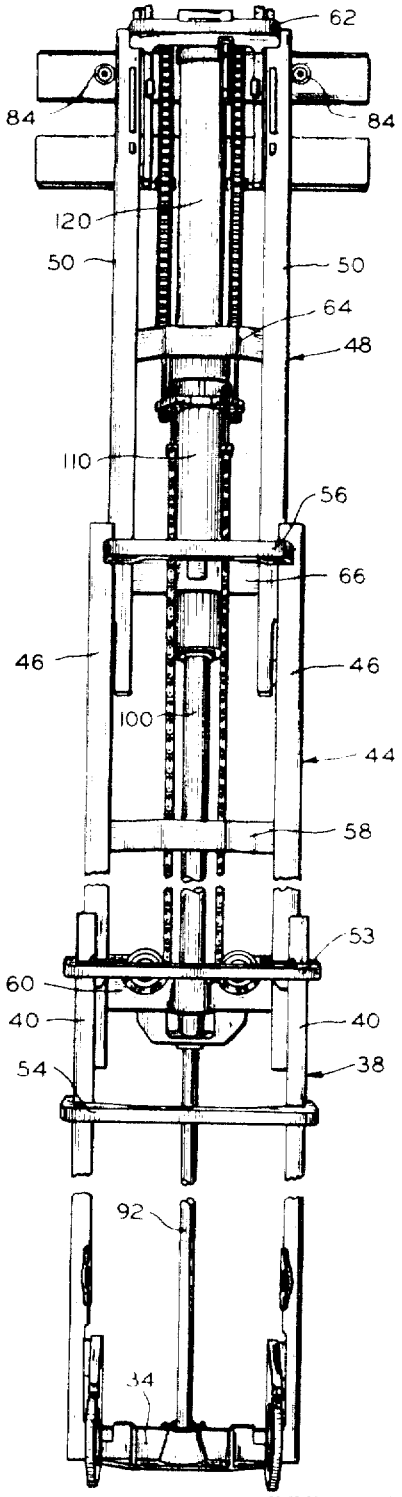
FIGURE 6 is a broken-away rear view of the upright assembly, as is FIG. 5, in a position of maximum elevation of both the load carriage and the extensible uprights.

Operation during the second phase of lifting from the position of elevation of the load carriage shown in FIG. 4 to maximum elevation thereof, as shown in FIG. 6, is as follows; continued communication of pressure fluid with ram cylinder assembly 90 effects extension of inner-outer tube assembly 108, 110 together with intermediate cylinder 120 outwardly relative to inner ram cylinder 100, and elevation of the latter ram cylinder with the intermediate mast section 44 and outwardly along pressure feed conduit 92. As pressure fluid continues to be supplied to the ram assembly with the load carriage in the position shown in FIG. 4, simultaneous extension of the intermediate cylinder 120 and inner-outer cylinder assembly 108, 110 causes the anchor plate on the outer cylinder 110 to be elevated therewith, which applies tension to the pair of chains 150 such that said chains cause simultaneously elevation of intermediate mast section 44 out of outer mast 38, which in turn elevates simultaneously inner ram cylinder 100 on feed cylinder conduit 92, since cylinder 100 is mounted upon the transverse brace 60 near the bottom end of the intermediate mast section. It will be apparent that as the intermediate mast section is elevated by the chain action 150 as aforesaid inner mast section 48 is being simultaneously telescoped outwardly of intermediate mast section 44, and the net results is that the telescopic mast sections 48 and 46 are telescope outwardly simultaneously from the FIG. 4 position to an intermediate elevation, as shown in FIG. 5, and thence to the maximum extension shown in FIG. 6. Throughout such elevation chain members 146 maintain the load carriage 51 adjacent the upper end of inner mast 48, and the telescopic ram assembly acting through the intermediate mast 44 by means of chains 150 and sprockets 152 effects such extension of the telescopic mast sections in relation to fixed mast section 38. Thus, a smooth and continuous elevation of the load carriage 51 is effected from ground level to maximum elevation at a constant speed of elevation, which is desirable.

Heretofore, to applicant's knowledge, in the telescopic upright art no triple-stage upright has been devised which is capable of a full free-lift load carriage operation and at the same time affords good operator visibility throughout the lifting cycle. In the FIG. 1 illustration, it will be noted that whenever the load carriage is in a load carrying position, i.e., with the load carriage elevated slightly above ground level, the operator has "picture window" visibility through the upright. During elevation from ground level to maximum elevation of the load carriage, chain members 150 never afford any significant degree of interference with operator visibility, and this has not heretofore, to applicant's knowledge, been achieved in such an upright construction. Again, as previously noted, chain members 150 are continuously nested behind flanges of the inner mast section 48 of substantially behind tubular elements of the cylinder ram assembly, so that these chains never interfere to any substantial degree with operator vision. In the full free-lift triple-stage upright construction of the prior art this result has never been achieved.

Although it is within the scope of the invention to provide chain reeving as described above in roller type uprights which do not provide forwardly offset mast sections in a direction longitudinal of the truck for reeving of part of the chains behind flange portions of the mast sections, as previously described. It may be possible to also utilize a chain reeving construction in sliding type upright not utilizing roller mounted mast sections, although such an arrangement is not believed to be economically feasible or practical. It should be understood that chain members 150 can be anchored at the inner transversely spaced ends thereof not only to an anchor 140 located on the outer cylinder member 110, but also can be readily anchored in a fully equivalent manner to anchor portions which can be connected to, for example, transverse brace 64 of inner mast section 48, inasmuch as the outer cylinder 110 and inner mast section 48 have no relative vertical movement to each other at any time.

Although I have described and illustrated a preferred embodiment of my invention, it will be understood by those skilled in the art that modifications may be made in the structure, form and relative arrangements of parts without departing from the spirit and scope of the invention. Accordingly, it should be understood that I intend to cover by the appended claims all such modifications which fall within the scope of my invention.

I claim:

1. A mast structure for lift trucks comprising outer, intermediate and inner *flanged* upright sections in telescoping relation to each other, a load carriage mounted on and movable along said inner upright section, an expansion unit having first, second and third relatively expansible and concentric elements, said first element being connected to said intermediate upright section, said second element being connected to said inner upright section, and said third element being connected to said load carriage and movable along said second element, a pair of transversely spaced sheave means mounted on said third element for rotation about an axis transverse of the truck, a pair of second transversely spaced sheave means mounted rotatably on said intermediate upright section at the lower end portion thereof for rotation about respective ones of a pair of transversely spaced longitudinally extending axes, a pair of first chain means operatively connected at the one ends thereof to the inner upright section, passing over respective ones of the first pair of sheave means and connected at the opposite ends to said load carriage, and a pair of second chain means operatively connected at the one ends thereof to said inner upright section, passing under the opposite ones of said second sheave means in opposite direction for separate connection adjacent the upper end portion of said outer upright section, said inner upright section being offset forwardly of said intermediate upright section to provide an open vertical space between the rear [*flanges*] of each side of said inner and intermediate upright sections, said pair of second chain means each having a vertically extending portion disposed at least partially in respective ones of said spaces closely adjacent to and behind the rear [end] *flanges* of the respective sides of said inner upright section, the chain reeving of said pair of second chain means providing minimum interference with visibility through the mast assembly during operation thereof.

2. A mast assembly as claimed in claim 1 wherein [said] [second pair of sheave means are adapted to rotate in a substantially common transverse plane and have a greater transverse spacing between the center thereof than the center spacing of said first pair of sheave means] *a fourth relatively expansible concentric element is secured to said second such element and is movable therewith in relation to said third such element, said second and fourth elements and inner upright section being immovable relative to each other.*

3. A mast assembly for a lift truck comprising first, second and third *flanged* upright sections, said second section being mounted for vertical movement on said first section, said third section being mounted for vertical movement on said second section, a load carriage mounted for vertical movement along said third section, a cylinder assembly mounted between said second and third sections, said assembly having a first hydraulic cylinder substantially the length of one of the upright sections connected to said second section, a second hydraulic cylinder slideable on the said first cylinder, connected to the third section and having a length substantially the length of one of the upright sections, a third hydraulic cylinder substantially one-half the length of one of the upright sections and slidable on the second cylinder and a fourth hydraulic cylinder secured to said second cylinder and slidable in relation to said third cylinder, said fourth cylinder and third upright section being immovable relative to each other, anchor means secured to said fourth cylinder, first sprocket means mounted at the upper end of the third cylinder and rotatable about an axis transverse of the truck, first chain means extending over said sprocket means and connected at one end to the load carriage, second spocket means mounted at the lower end of said second upright section and rotatable about an axis longitudinal of the truck, and second chain means extending beneath said second sprocket means and connected at one end thereof to the upper end portion of the first upright section, the opposite ends of said first and second chain means being secured to said anchor means, *one of said upright sections being offset in a forward direction relative to an adjacent section whereby to provide a vertical space in a direction forwardly of the truck between the rear flanges of said latter upright sections, a portion of the second chain means being disposed at least partially in said vertical space closely adjacent to and behind the rear flange of said one upright section.*

[4. A mast structure for lift trucks comprising outer, intermediate and inner upright sections in telescoping relation to each other, a load carriage mounted on and movable along said inner upright section, an expansion unit having first, second, third and fourth expansible and concentric elements, said first element being connected to said intermediate upright section, said second element being connected to said inner upright section, and to said fourth element, and said third element being connected to said load carriage and movable along said second element, said fourth element and inner upright section being immovable relative to each other, anchor means secured to said fourth element, first sheave means mounted on said third element for rotation about an axis transverse of the truck, second sheave means mounted on said intermediate upright section for rotation about an axis longitudinal of the truck, first chain means connected to said anchor means, passing over the first sheave means and connected to said load carriage, and second chain means connected to said anchor means, passing under said second sheave means and connected to the upper end portion of said outer upright section.]

5. A mast structure for lift trucks comprising outer, intermediate and inner *flanged* upright section in telescoping relation to each other, a load carriage mounted on and movable along said inner upright section, [one of] said *inner* upright [sections] section being offset forwardly of [another of] said upright section[s] to provide a vertical forwardly extending space between the rear [ends] *flanges* of said latter upright section, an expansion unit having first, second, [and] *third and fourth* expansible and concentric elements, said first element being connected to said intermediate upright section, said second element being connected to said inner upright section *and to said fourth element* [and] said third element being connected to said load carriage and movable along said second element, *said second and fourth elements and said inner upright section being immovable relative to each other a* first *pair of transversely spaced* sheave means mounted on said third element for rotation about an axis transverse of the truck, *a* second sheave means mounted on said intermediate upright section for rotation *in a substantially common plane about* [an axis] longitudinal of the truck *having a greater transverse spacing than the spacing between the centers of said first pair of sheave means,* first chain means operatively connected at one end to the inner upright section, passing over the first sheave means and connected at the opposite end to said load carriage, and second chain means operatively connected at one end to said inner upright section, passing under said second sheave means and connected at the opposite end to the upper end portion of said outer upright section, said second chain means having a vertically extending portion thereof disposed at least partially in said vertical forwardly extending space *closely adjacent to and behind the rear flanges of said inner upright section, said chain reeving of said second chain means providing minimum interference with visibility through the mast assembly during operation of the truck.*

[6. A mat assembly as claimed in claim 5 wherein said second sheave means are adapted to rotate in a substantially common plane and have a greater transverse spacing between the centers thereof than said first pair of sheave means.]

[7. A mast assembly for lift trucks comprising first, second and third mast sections said second mast section being mounted for vertical movement on said first mast section, said third mast section being mounted for vertical movement on said second mast section, a load carriage mounted for vertical movement along said third mast section, a hoist cylinder assembly mounted between said second and third mast sections, said assembly having a first hydraulic cylinder substantially the length of one of the mast sections connected to said second mast section, a second hydraulic cylinder slidable on said first cylinder, connected to the third mast section and having a length substantially the length of one of the mast sections, a third hydraulic cylinder substantially one-half the length of one of the mast sections and slidable on the second cylinder, first sprocket means mounted at the upper end of the third cylinder and rotatable about an axis transverse of the truck, first chain means *operatively connected at* one end to the third mast section, extending over said sprocket means and connected at the other end to the load carriage, second sprocket means mounted at the lower end of said second mast section and rotatable about an axis longitudinal of the truck, and second chain means operatively connected at one end to the third mast section, extending beneath said second sprocket means and connected at the opposite end to the upper end portion of the first mast section, one of said mast sections being offset in a forward direction relative to an adjacent mast section whereby to provide a vertical space in a direction forwardly of the truck between the rear ends of said latter mast sections, a portion of the second chain means being disposed at least partially in said vertical space.]

8. A mast [assembly] as claimed in claim [7] *9* wherein [said first sprocket means comprises a pair of transversely spaced sprockets reeving a pair of chains which comprises said first chain means, and said second sprocket means comprises a pair of transversely spaced sprockets rotatable about transversely spaced longitudinal axes and reeving a pair of chains which comprises said second chain means] *second chain means is connected to said anchor means transversely inwardly of the connection thereto of said first chain means.*

9. A mast structure for lift trucks comprising first, second and third *flanged* mast sections in telescoping relation to each other, a load carriage mounted on and movable along said third mast section, an expansion unit having first, second, third and fourth expansible and concentric elements, said first element being connected to said second mast section, said second element being connected to said third mast section, said third element being connected to said load carriage and movable along said second element, and said fourth element being connected to said second element and slidable in relation to said third element, said fourth element and third mast section being immovable relative to each other, anchor means secured to said fourth element, first sheave means mounted on said third element for rotation about an axis transverse of the truck, second sheave means mounted on said second mast section for rotation about an axis longitudinal of the truck, first chain means connected to the anchor means, passing over the first sheave means and connected to said load carriage, second chain means connected to said anchor means, passing under said second sheave means and connected to the upper end portion of the first mast section, one of said mast sections being offset forwardly of another of said mast section to provide a vertical forwardly extending space between the rear [ends] *flanges* of said latter mast sections, said second chain means having a vertically extending portion thereof disposed at least partially in said vertical space closely adjacent to and behind the rear flanges of said third mast section so as to reduce interference with visibility through the mast assembly during operation of the truck.

[10. A mast structure for lift trucks comprising outer, intermediate and inner mast sections in telescoping relation to each other, a load carriage mounted on and movable along said inner mast section, an expansion unit having first, second and third relatively expansible and concentric elements, said first element being connected to said intermediate mast section, said second element being connected to said inner mast section, and said third element being connected to said load carriage and movable along said second element, a first pair of transversely spaced sheave means mounted on said third element for rotation about an axis transverse of the truck, a second pair of sheave means mounted on said intermediate mast section in transversely spaced relation for rotation about transversely spaced longitudinally extending axes, first chain means operatively connected to the inner mast section, passing over the first pair of sheave means and connected to said load carriage, and second chain means operatively connected to the iner mast section, passing under said second pair of sheave means outwardly in opposite direction for separate connection adjacent to the upper portion of said outer mast section, said chain reeving of said second chain means providing minimum interference with visibility through the mast assembly during operation of the truck.]

[11. A mast structure as claimed in claim 5 wherein said inner upright section is offset forwardly of said intermediate upright section to provide said vertical forwardly extending space between the rear ends of said inner and intermediate upright sections.]

[12. A mast assembly as claimed in claim 5 wherein said second sheave means comprises a pair of sheaves or sprockets mounted in transversely spaced relation and rotatable about transversely spaced longitudinal extending axes, and said second chain means includes a pair of chains which extend beneath opposite ones of said pair of sheaves outwardly in opposite directions for separate connection adjacent the upper end of said outer upright section, said chain reeving of said second chain means providing minimum interference with visibility through the mast assembly during operation of the truck.]

References Cited

The following references, cited by the Examiner, are of record in the patented file of this patent or the original patent.

UNITED STATES PATENTS

| | | | |
|---|---|---|---|
| 1,032,819 | 7/1912 | Driscoll | 187—17 |
| 3,053,050 | 9/1962 | Sommerer | 187—17 UX |
| 2,987,140 | 6/1961 | Olson | 187—9 |
| 2,670,811 | 3/1954 | Shaffer | 187—9 |
| 2,936,047 | 5/1960 | Quayle | 187—9 X |
| 3,077,951 | 2/1963 | Ramsey | 187—9 |
| 3,208,556 | 9/1965 | Shaffer | 187—9 |

FOREIGN PATENTS

| | | | |
|---|---|---|---|
| 1,041,864 | 10/1958 | Germany | 187—9 |
| 1,115,009 | 4/1956 | France | 187—17 |
| 772,610 | 4/1957 | Great Britain. | |
| 966,123 | 5/1961 | Great Britain. | |

EVON C. BLUNK, Primary Examiner

M. F. MAFFEI, Assistant Examiner